United States Patent
Sennoun et al.

(10) Patent No.: US 7,858,252 B2
(45) Date of Patent: Dec. 28, 2010

(54) ACTIVE CONTROL STRATEGY FOR PEM FUEL CELL LIQUID WATER EVACUATION

(75) Inventors: Mohammed E Sennoun, Pittsford, NY (US); Robert C Reid, Livonia, NY (US)

(73) Assignee: GM Global Technology Operations, Inc.

( * ) Notice: Subject to any disclaimer, the term of this patent is extended or adjusted under 35 U.S.C. 154(b) by 1026 days.

(21) Appl. No.: 10/878,709

(22) Filed: Jun. 28, 2004

(65) Prior Publication Data

US 2005/0287412 A1    Dec. 29, 2005

(51) Int. Cl.
*H01M 8/04* (2006.01)
*H01M 8/00* (2006.01)

(52) U.S. Cl. .................. 429/430; 429/432; 429/400; 429/512

(58) Field of Classification Search .................. 429/22, 429/23, 400, 428, 430, 432, 512
See application file for complete search history.

(56) References Cited

U.S. PATENT DOCUMENTS

| | | | |
|---|---|---|---|
| 5,272,017 A | 12/1993 | Swathirajan et al. | |
| 5,316,871 A | 5/1994 | Swathirajan et al. | |
| 5,366,821 A * | 11/1994 | Merritt et al. | 429/21 |
| 6,037,072 A * | 3/2000 | Wilson et al. | 429/33 |
| 6,696,190 B2 * | 2/2004 | Haridoss | 429/22 |
| 6,841,278 B2 * | 1/2005 | Reiser et al. | 429/13 |

* cited by examiner

*Primary Examiner*—Patrick Ryan
*Assistant Examiner*—Julian Mercado
(74) *Attorney, Agent, or Firm*—Harness, Dickey & Pierce, P.L.C.

(57) ABSTRACT

The present invention provides a fuel cell stack and a method of operating the same that allows for removal of liquid water and minimizes the impact of liquid water on the performance of the fuel cells. By selectively blocking the cathode reactant flow from exiting the fuel cell stack improved water management can be achieved. The selective blocking of the cathode reactant from exiting the fuel cell stack also helps to increase the partial pressure of the oxygen toward the exit side of the fuel cell stack which improves the chemical kinetics and the voltage produced by the fuel cells.

13 Claims, 1 Drawing Sheet

ACTIVE CONTROL STRATEGY FOR PEM FUEL CELL LIQUID WATER EVACUATION

FIELD OF THE INVENTION

The present invention relates to fuel cells, and more particularly, to active control strategies for managing operation of the fuel cell.

BACKGROUND OF THE INVENTION

Fuel cells are used or have been proposed as a power source in many applications. For example, fuel cells have been proposed for use in electrical vehicular power plants to replace internal combustion engines and for use in stationary applications to produce electrical power. In proton exchange membrane (PEM) type fuel cells, hydrogen is supplied to the anode of the fuel cell and oxygen is supplied to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which serve as current collectors for the anode and cathode, and contain appropriate channels and/or openings therein for distributing the fuel cells' gaseous reactants over the surfaces of the respective anode and cathode catalysts. A typical PEM fuel cell and its MEA are described in U.S. Pat. Nos. 5,272,017 and 5,316,871 issued respectively Dec. 21, 1993 and May 31, 1994 and assigned to General Motors Corporation.

The term "fuel cell" is typically used to refer to either a single cell or a plurality of cells depending on the context. A plurality of individual cells are commonly bundled together to form a fuel cell stack. Each cell within the stack comprises the MEA described earlier, and each MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluorinated sulfonic acid. The anode/cathode typically comprises finely divided catalytic particles, which are often supported on carbon particles, and mixed with a proton conductive resin. These MEAs require certain conditions, including proper water management and humidification, for effective operation.

The electrically conductive plates sandwiching the MEAs may contain reactant flow fields for distributing the fuel cells' gaseous reactants over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels. Water (also known as product water) is generated at the cathode electrode based on the electrochemical reactions between hydrogen and oxygen occurring within the MEA. Efficient operation of the fuel cell depends on the ability to provide proper and effective water management in the system. Depending upon the operating conditions of the fuel cell stack, the water may be present in a liquid form. As the quantity of liquid water builds up, the liquid water may plug the channels through which the gaseous reactants are flowing. Additionally, the liquid water can prevent or inhibit the oxygen within the cathode flow path from traveling through the diffusion media and into contact with the catalyst layer thereby limiting the voltage production of the fuel cell stack. Thus, it would be advantageous to provide a fuel cell stack and a method of operating the same that effectively removes the liquid water formed in the fuel cells while avoiding the adverse impact on the performance of the fuel cells that can occur due to the formation of the liquid water.

SUMMARY OF THE INVENTION

The present invention provides a fuel cell stack and a method of operating the same that allows for removal of liquid water and minimizes the impact of liquid water on the performance of the fuel cells. The inventors have discovered that by selectively blocking the cathode reactant flow from exiting the fuel cell stack, improved water management can be achieved. The selective blocking of the cathode reactant from exiting the fuel cell stack also helps to increase the partial pressure of the oxygen toward the exit side of the fuel cell stack which improves the chemical kinetics and the current produced by the fuel cells.

A fuel cell system according to the principles of the present invention includes a plurality of fuel cells that are arranged into a fuel cell stack. There is a cathode reactant flow path through the fuel cell stack. A valve, which is selectively operable between open and closed positions, is used to selectively block all flow in the cathode reactant flow path from exiting the fuel cell stack during operation of the fuel cell stack.

In another aspect of the present invention, a method of operating a fuel cell system is disclosed. The method includes: (1) operating the fuel cell stack to produce a voltage output; (2) blocking flow in the cathode flow path exiting the fuel cell stack; (3) allowing flow in the cathode flow path to exit the fuel cell stack; and (4) alternating between performing (2) and (3) while the fuel cell stack is operating.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
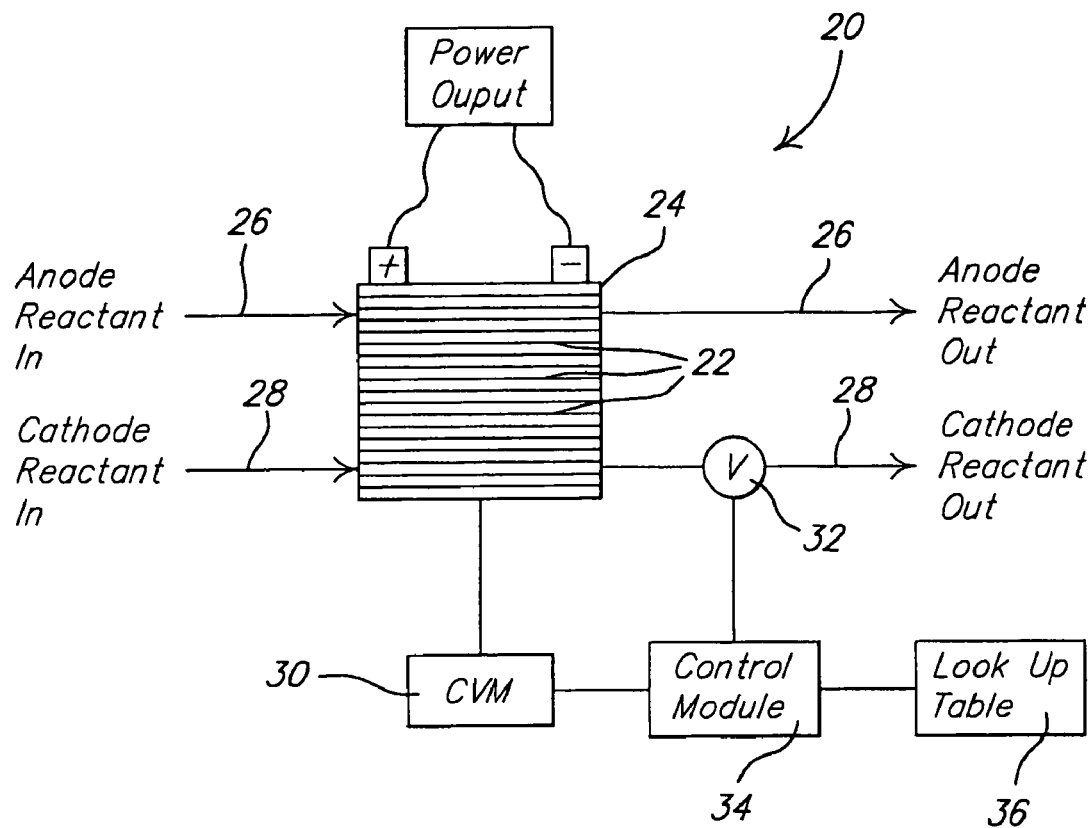
FIG. 1 is a schematic representation of a fuel cell system according to the principles of the present invention.

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

Referring now to FIG. 1, a fuel cell system 20 according to the principles of the present invention is shown. Fuel cell system 20 includes a plurality of fuel cells 22 arranged in a stacked configuration to form a fuel cell stack 24. Fuel cell stack 24 has an anode reactant flow path 26 and a cathode reactant flow path 28. Each flow path 26, 28 includes the internal flow paths within each fuel cell 22 within fuel cell stack 24 along with the plumbing used to supply and remove the respective anode and cathode reactants to and from the appropriate flow paths within fuel cell stack 24. Anode reactant flow path 26 receives a hydrogen-containing anode reactant stream while cathode reactant flow path 28 receives an oxygen-containing cathode reactant stream. Each fuel cell 22 within stack 24 is operable to convert the anode and cathode reactants into electricity, a hydrogen-containing anode effluent and an oxygen-containing cathode effluent.

The hydrogen-containing anode reactant can be provided from a variety of sources. Such sources include, but are not limited to, a reformate stream from a reformer and hydrogen from a hydrogen storage device. The cathode reactant can also be provided from a variety of sources. Such sources include, but are not limited to, oxygen supplied from an oxygen storage device and air drawn from the environment within which fuel cell system 20 is employed. The anode reactant supply to the fuel cells in the fuel cell stack and the venting of the anode effluent produced in the fuel cell stack will not be discussed in detail. It should be understood that anode reactant will be supplied to the various fuel cells and fuel cell stack in a quantity sufficient to meet the operational demands of fuel cell system 20 and that anode effluent will be removed from fuel cell stack 24 as needed.

A cell voltage monitoring device (CVM) 30 is in communication with fuel cell stack 24 and the fuel cells 22 therein. CVM 30 is operable to monitor the voltage produced or output of each of the individual fuel cells, of groups or clusters of fuel cells and/or the voltage output of the entire fuel cell stack.

A blocking device, in this instance in the form of a valve 32, is located in cathode reactant flow path 28 downstream of fuel cell stack 24. Valve 32 is operable to selectively block flow within cathode reactant flow path 28 from exiting fuel cell stack 24. Valve 32 will be operated, as described below, to selectively block cathode reactant from exiting fuel cell stack 24 to produce a desired operation of fuel cell stack 24 and fuel cell system 20.

A control module 34 is in communication with valve 32, cell voltage monitor 30, and other components (not shown) of fuel cell system 20. Control module 34 controls the operation of valve 32 and causes valve 32 to selectively open and close to selectively block flow within cathode reactant flow path 28 from exiting fuel cell stack 24, as described below.

The inventors of the present invention have discovered that by selectively operating valve 32 to selectively block flow within the cathode reactant flow path 28 from exiting fuel cell stack 24, improved operation of individual fuel cells 22 and of fuel stack 24 can be achieved. One of the improvements includes the management of liquid water formed within cathode reactant flow path 28. When the typical fuel cell stack is operated without selectively blocking the flow within cathode reactant flow path 28 from exiting fuel cell stack 20, liquid water formed therein typically leaves in relatively large slugs. That is, as liquid water builds up within cathode reactant flow path 28, the blockage caused by liquid water increases until the blockage is such that the liquid water is expelled in a relatively large slug of liquid water. By selectively opening and closing the valve 32, the liquid water formed in cathode reactant flow path 28 is expelled in smaller droplets and on a more continuous or semi-continuous nature. When valve 32 closes, the pressure within cathode reactant flow path 28 upstream of valve 32 increases. The increase in pressure within cathode reactant flow path 28 upstream of valve 32 causes an increase in the pressure differential across valve 32.

When valve 32 is subsequently opened, the increased pressure differential causes a rush of cathode reactant out of fuel cell stack 24 which helps remove the liquid water formed therein. Valve 32 is typically closed for only a very short duration and remains open for significantly longer durations between the brief durations it is closed. The quick closing and reopening of valve 32 so that it is only closed for a very short duration causes pulsations in the back pressure or pressure increases within cathode reactant flow path 28 upstream of valve 32. This pulsing of pressure increases results in the liquid water that is removed from cathode reactant flow path 28 and fuel cell stack 24 to produce a semi-continuous stream of small droplets of liquid water. The semi-continuous nature and the form of the water in small droplets is beneficial to the operation of fuel cell stack 24. The semi-continuous nature avoids large concentrations of liquid water forming within cathode reactant flow path 28 within fuel cell stack 24 which have a detrimental impact on the performance of the individual fuel cells 22 and fuel cell stack 24.

Control module 34 opens and closes valve 32 for predetermined periods of time. That is, control module 34 closes valve 32 for a first predetermined period of time and then opens valve 32 for a second predetermined period of time. The predetermined periods of time can vary depending upon the operational conditions of fuel cells 22, fuel cell stack 24 and/or fuel cell system 20 along with the demand placed upon fuel cell system 20. The predetermined periods of time can be based upon empirical data from a test mockup of the same or similar type of fuel cell stack 24 and fuel cell system 20. The empirical data can be used to form a lookup table 36 that is accessible by control module 34 to control the operation of valve 32. The lookup table provides the appropriate open and close time intervals for various operating conditions of the fuel cells, fuel cell stack, and fuel cell system. Such operating conditions can include, but are not limited to, power output of individual fuel cells, groups of fuel cells, and fuel cell stack, power demand placed on the fuel cell system, upward or downward transients in the power demand, a high frequency resistance of the individual fuel cells, group of fuel cells, stack and/or system. If desired, an algorithm can be developed for use by control module 34 in place of lookup table 36. Again, it is anticipated that valve 32 will be closed for a duration that is significantly shorter than the duration for which valve 32 remains open. In essence, valve 32 is primarily open with small, very short durations of time within which valve 32 is closed.

Control module 34 monitors the appropriate operating parameters and refers to lookup table 36 to find or the algorithm to determine the appropriate predetermined times or durations for maintaining valve 32 in the closed and open states. As the operating performance of fuel cell stack, the individual fuel cells and/or fuel cell system changes, control module 34 can adjust the operation of valve 32 accordingly. Preferably, lookup table 36 and the algorithm are based on the power demand placed on fuel cell system 20. As the power demand placed on fuel cell system 20 changes, the expected voltage production output of the individual fuel cells and of the fuel cell stack will change. Control module 34 monitors these differing parameters and, based on these new parameters, uses the appropriate information within lookup table 36 or the algorithm to adjust the operation of valve 32. In an alternate embodiment, the high frequency resistance is used and the data in lookup table 36 and the algorithm are based upon a high frequency resistance (HFR) of the fuel cells, group of fuel cells, and/or of the fuel cell stack. Control module 34 monitors the appropriate high frequency resistance (cells, group of cells, or fuel cell stack) and refers to lookup table 36 or the algorithm to control and adjust the operation of valve 32. Accordingly, fuel cell system 20 and valve 32 can be operated to produce improved water management of liquid water that may be formed in the cathode reactant flow path 28 during operation of fuel cell stack 24.

Operation of valve 32 can also increase the voltage production of the individual fuel cells 22 and/or fuel cell stack 24 by increasing the partial pressure of the cathode reactant in cathode reactant flow path 28. As cathode reactant travels through cathode reactant flow path 28, the oxygen gets consumed during the production of electricity. As the oxygen gets consumed, the total pressure in cathode reactant flow path 28 decreases, thereby also decreasing the partial pressure of the oxygen within cathode reactant flow path 28. This is particularly true at the end of the flow path 28 just prior to exiting fuel cell stack 24. The chemical kinetics at the catalyst layer of the MEA are strongly dependent upon the partial pressure of the oxygen at that location. The greater the oxygen partial pressure, the more reaction that occurs at that location of the catalyst layer. Toward the end of the cathode reactant flow path 28 just prior to exiting fuel cell stack 24, the least amount of current is typically produced because of the lower oxygen partial pressure. Closing valve 32 causes the cathode reactant pressure within cathode reactant flow path 28 upstream of valve 32 to increase. The increase in this pressure thereby causes an increase in the oxygen partial pressure in cathode reactant flow path 28 upstream of valve 32. Because valve 32 is only closed for a very short duration, the pressure increase may be somewhat localized with the highest pressure increase occurring in the portion of cathode reactant flow path 28 just upstream of valve 32. This increase in the oxygen partial pressure increases the reactions that occur toward the end of cathode reactant flow path 28 within fuel cell stack 24. Therefore, the overall reactions that occur within fuel cell stack 24 are increased and an increased voltage output of the individual fuel cells 22 and/or fuel cell stack 24 can be achieved. Thus, control module 34 can be used to operate valve 32 to cause an increase in the partial pressure of the oxygen within the cathode reactant in cathode reactant flow path 28 upstream of valve 32.

Control module 34 can control the operation of valve 32 to achieve a desired pressure differential across valve 32 for certain predetermined time periods. The predetermined time periods can be ascertained from accessing lookup table 36. Alternatively, control module 34 can utilize an algorithm that, in conjunction with the operating characteristics of fuel cell system 20, yields the appropriate time intervals for closing and opening valve 32. Thus, control module 34 and valve 32 can be used to increase the voltage output of fuel cells 22 and/or fuel cell stack 24 by selectively increasing the partial pressure of oxygen within the anode reactant flow path 28 in fuel cell stack 24.

Fuel cell system 20 according to the principal of the present invention can also be used to increase the residence time of the cathode reactant within fuel cell stack 24. That is, when valve 32 is closed, cathode reactant within cathode reactant flow path 28 is prevented from exiting fuel cell stack 24. The temporary blocking of the cathode reactant from exiting fuel cell stack 24, increases the time for which the cathode reactant resides within the fuel cells 22 and within fuel cell stack 24. By increasing the residence time, the oxygen within the cathode reactant has a longer opportunity to react to produce electrical energy. The blocking of cathode reactant flow path 28 can be done for durations that provide for a desired residence time of the cathode reactant flowing through cathode reactant flow path 28. Because valve 32 will be intermittently opened and closed, the average residence time of the cathode reactant flowing through fuel cell stack 24 will be increased. Control module 34 can control the operation of valve 32 based upon predetermined time intervals and other operating parameters of fuel cell system 20 by accessing lookup table 36 and adjusting the operation of valve 32 accordingly. Alternatively, control module 34 can utilize an algorithm along with other operating parameters of fuel cell system 20 to determine the appropriate durations of opening and closing valve 32. Thus, fuel cell system 20 according to the principles of the present invention can be operated to produce a desired residence time of a cathode reactant flowing through the fuel cell stack 24.

While the present invention has been described by reference to specific examples shown in the FIGURE, it should be appreciated that variations can be made in fuel cell system 20 and its operation without departing from the scope of the present invention. For example, while blocking device 32 has been described as being a valve, it should be appreciated that any type of device capable of pulse modulation with a fast enough response time to open and close as demanded by control module 34 can be employed. Furthermore, while the blocking device has been described as being a valve, it should be appreciated that the valve can take a variety of forms. For example, valve 32 could be a simple on/off valve, a gate valve, a ball valve, a globe valve, or similar type valves as long as the response time is sufficient to meet the demands placed upon valve 32 by control module 34. Furthermore, the specific type of valve and size of valve will vary depending upon the size of fuel cell system 20. It should also be appreciated that while the present invention is operated to intermittently or temporarily block flow of cathode reactant from exiting fuel cell stack 24, control module 34 operates valves 32 so as to not deplete the oxygen within fuel cell stack 24 prior to being reopened. In other words, fuel cell system 20 is controlled so that the reaction occurring within fuel cell stack 24 is not starved of oxygen due to the temporary blocking of cathode reactant from flowing out of fuel cell stack 24. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A method of operating a fuel cell system having a fuel cell stack operable to convert an anode reactant flowing through an anode flow path and a cathode reactant flowing through a cathode flow path into an anode effluent, a cathode effluent, and a voltage output, the cathode flow path having a blocking member downstream of the fuel cell stack operable to selectively block all flow in said cathode flow path from exiting the fuel cell stack, the method comprising:
   (a) operating the fuel cell stack to convert the anode and cathode reactants and produce the voltage output;
   (b) closing a blocking device in the cathode flow path to block all flow in the cathode flow path from exiting the fuel cell stack;
   (c) opening the blocking device to reduce a backpressure in the cathode flow path to produce a stream of droplets from liquid water formed in the cathode flow path and to allow flow in the cathode flow path to exit the fuel cell stack; and
   (d) alternating between performing (b) and (c) while the fuel cell stack is operating,
   wherein (b) is performed for a first predetermined period of time, (c) is performed for a second predetermined period of time, (d) includes alternating between performing (b) and (c) based upon said first and second predetermined periods of time, and the reaction occurring in the fuel cell stack is not starved of oxygen during the closing step.

2. The method of claim 1, further comprising determining said first and second predetermined periods of time based upon a voltage output of the fuel cell stack.

3. The method of claim 1, further comprising determining said first and second predetermined periods of time based upon a voltage output of each fuel cell in the fuel cell stack.

4. The method of claim 1, further comprising determining said first and second predetermined periods of time based upon a high frequency resistance of the fuel cell stack.

5. The method of claim 1, wherein said first predetermined period of time is selected so as to not starve the conversion occurring within the fuel cell stack of cathode reactant.

6. A method of controlling residence time of a cathode reactant stream within a fuel cell stack during voltage production, the fuel cell stack having a cathode reactant flow path through which the cathode reactant stream flows, the method comprising:
   (a) providing a cathode reactant stream to the fuel cell stack;
   (b) operating the fuel cell stack to produce a voltage output with a reaction between an anode reactant and said cathode reactant stream;
   (c) temporarily closing a blocking device positioned in the cathode reactant flow path and to block an entirety of said cathode reactant stream from exiting the fuel cell stack to provide a desired residence time of said cathode reactant stream in the fuel cell stack; and
   (d) opening the blocking device to reduce a backpressure in the cathode flow path to produce a stream of droplets from liquid water formed in the cathode flow path to preclude a slug of the liquid water from exiting from the fuel cell stack;
   wherein the reaction occurring in the fuel cell stack is not starved of oxygen during the closing step.

7. The method of 6, wherein (c) further includes intermittently blocking said entirety of said cathode reactant stream from exiting the fuel cell stack for a predetermined period of time.

8. The method of claim 6, wherein (c) further includes maintaining the residence time for a duration that avoids starving the reaction in the fuel cell stack.

9. The method of claim 6, wherein (c) is performed based upon a voltage output of fuel cells within the fuel cell stack.

10. A method of water management during operation of a fuel cell stack having a cathode reactant flow path through which a cathode reactant stream flows, the method comprising:
    (a) operating the fuel cell stack to produce a desired power output;
    (b) temporarily closing a blocking device positioned in the cathode reactant flow path by command from a control module to create a backpressure in the cathode reactant flow path and to block an entirety of the cathode reactant stream in the cathode reactant flow path from exiting the fuel cell stack; and
    (c) opening the blocking device by command from the control module to reduce the backpressure in the cathode reactant flow path causing liquid water in the cathode reactant flow path to exit the cathode reactant flow path in droplets;
    wherein a reaction occurring in the fuel cell stack between the cathode reactant and an anode reactant is not starved of oxygen during the preventing of the entirety of the cathode reactant stream from exiting.

11. The method of claim 10, wherein (c) includes said liquid water exiting the cathode reactant flow path in a semi-continuous stream of droplets.

12. The method of claim 10, wherein (b) includes intermittently blocking the entirety of the cathode reactant stream from exiting the fuel cell stack for a predetermined period of time.

13. The method of claim 10, wherein (b) is performed based upon a voltage output of fuel cells within the fuel cell stack.

* * * * *